E. L. LOVEJOY.
HOSE SUPPORTER.
APPLICATION FILED MAY 27, 1918.

1,298,525.

Patented Mar. 25, 1919.

Inventor:
Emma L. Lovejoy.
By her attorney,
Charles N. Gooding.

UNITED STATES PATENT OFFICE.

EMMA L. LOVEJOY, OF WAKEFIELD, MASSACHUSETTS.

HOSE-SUPPORTER.

1,298,525.  Specification of Letters Patent.  Patented Mar. 25, 1919.

Application filed May 27, 1918. Serial No. 236,704.

*To all whom it may concern:*

Be it known that I, EMMA L. LOVEJOY, a citizen of the United States, residing at Wakefield, in the county of Middlesex and State of Massachusetts, have invented new and useful Improvements in Hose-Supporters, of which the following is a specification.

This invention relates to an improved hose supporter.

The object of the invention is to provide a supporter for hose which will not injure the same. It is very common for the type of hose supporter consisting of a loop and stud to injure the hose which is supported thereby by cutting one or more of the strands of thread composing the hose and allowing it to ravel down, thus spoiling the hose.

This invention has for its object to prevent such injury and accomplishes this end, preferably, by covering the loop with a rubber tube, the head of the stud also being covered, so that when the hose is clamped between the stud and the loop it is clamped between yielding surfaces both on the loop and on the stud, and thus no injury to the hose occurs, nor any slipping of the hose on the fastener.

In carrying out my invention in practical use I prefer to use a rubber tube to cover the wire which forms the loop, but said covering may be of fabric or any yielding material, and while a tube is the preferred form, any form of loop which has the inner edges thereof covered with yielding material is contemplated by my invention.

The invention consists in the combination and arrangement of parts set forth in the following specification and particularly pointed out in the claims thereof.

Referring to the drawings.

Like numerals refer to like parts throughout the several views of the drawings.

Figure 1:
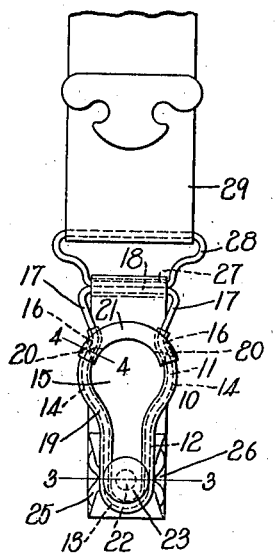
Figure 1 is a front elevation of my improved hose supporter.
Figure 2:
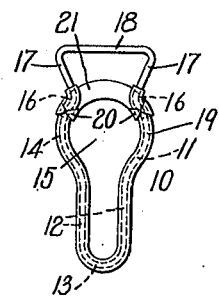
Fig. 2 is a rear elevation of the loop, which constitutes the novel portion of my improved hose supporter.

In the drawings, 10 is the loop consisting of a wire 11 which terminates at its lower end in two legs 12 connected together by a half round portion 13 at the bottom thereof, said wire extending outwardly on the opposite sides of the loop above the legs 12 at 14 to form an enlarged space 15 for the introduction of the head of the button, the opposite sides of said loop being contracted at 16 and again curved outwardly at 17, terminating at the top in a cross-bar 18.

A tube 19, preferably of rubber, covers a portion only of the loop 10, viz. the legs 12, the half round portion 13 and the outward bends 14 and is clamped to the wire 11 adjacent to the ends of said tube by the two pairs of oppositely disposed V-shaped ears 20 on a clamp plate 21 which extends across the loop connecting the contracted portions 16 of the wire, thus firmly fastening the ends of the rubber tube to the wire of the loop, so that in use the ends of the tube cannot be pulled downwardly upon the wire of the loop.

The stud 22 has a head 23 which is covered with fabric 24 and is fastened to a plate 25, said plate being fastened to a doubled tape 26 which extends upwardly at the rear of the loop 10 and projects through the loop 10 at the upper end thereof and around a metal band 27 which connects the loop to an auxiliary loop 28, which auxiliary loop is connected to the webbing 29 of the hose supporter.

Figure 3:
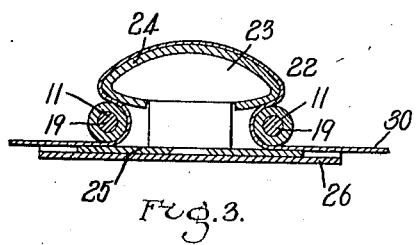
Fig. 3 is an enlarged section taken on line 3—3 of Fig. 1.
Figure 4:
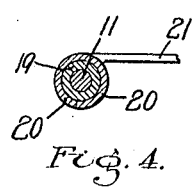
Fig. 4 is an enlarged section taken on line 4—4 of Fig. 1.

The invention is used in the usual manner of stud and loop hose supporters by pushing a portion of the hose through the space 15 by means of the stud 22 and then pushing the stud downwardly in the space between the legs 12 of the loop. As seen in Fig. 3 the material 30 of the hose is then clamped between the heead of the stud and the legs of the loop, the portion so clamped coming into contact with the yielding covering 19 of the loop and the yielding covering 24 of the stud so that no injury is sustained by the hose in this clamped relation.

It will be seen that as the hose is clamped between the covered stud and a covered loop or between a stud and a covered loop, there can be no slipping of the hose on the supporter.

Having thus described my invention, what I claim and desire by Letters Patent to secure is:

1. A hose supporter having, in combination, a loop formed of wire, a stud adapted to project into said loop, a rubber tube covering a portion only of said loop, a clamp extending across said loop and ears on said clamp adapted to extend around said wire and rubber tube adjacent to the ends of said tube, whereby said ends are clamped to said wire.

2. A hose supporter having, in combination, a loop formed of wire, a stud adapted to project into said loop, a rubber tube covering a portion only of said loop, a clamp extending across said loop and two pairs of oppositely disposed V-shaped ears on said clamp adapted to extend around said wire and rubber tube adjacent to the ends of said tube whereby said ends are clamped to said wire.

In testimony whereof I have hereunto set my hand in presence of two subscribing witnesses.

EMMA L. LOVEJOY.

Witnesses:
CHARLES S. GOODING,
SYDNEY E. TAFT.